United States Patent
Huang et al.

(10) Patent No.: US 12,182,343 B2
(45) Date of Patent: Dec. 31, 2024

(54) VIRTUAL REALITY TRACKER AND TRACKER CORRECTION POSITION METHOD

(71) Applicant: HTC Corporation, Taoyuan (TW)

(72) Inventors: Chun-Kai Huang, Taoyuan (TW); Chih-Chien Chen, Taoyuan (TW); Yan-Ru Chen, Taoyuan (TW)

(73) Assignee: HTC CORPORATION, Taoyuan (TW)

( * ) Notice: Subject to any disclaimer, the term of this patent is extended or adjusted under 35 U.S.C. 154(b) by 0 days.

(21) Appl. No.: 17/898,687

(22) Filed: Aug. 30, 2022

(65) Prior Publication Data

US 2024/0069651 A1 Feb. 29, 2024

(51) Int. Cl.
| | |
|---|---|
| *G06F 3/0346* | (2013.01) |
| *G01C 21/16* | (2006.01) |
| *G06F 3/01* | (2006.01) |
| *G06F 3/03* | (2006.01) |
| *G06T 7/73* | (2017.01) |

(52) U.S. Cl.
CPC ....... *G06F 3/0346* (2013.01); *G01C 21/1656* (2020.08); *G06F 3/011* (2013.01); *G06F 3/0308* (2013.01); *G06T 7/74* (2017.01); *G06T 2207/30196* (2013.01)

(58) Field of Classification Search
CPC ...... G06F 3/0346; G06F 3/011; G06F 3/0308; G01C 21/1656; G06T 7/74; G06T 2207/30196
See application file for complete search history.

(56) References Cited

U.S. PATENT DOCUMENTS

| | | | | |
|---|---|---|---|---|
| 9,649,558 | B2* | 5/2017 | Stafford | G06F 3/011 |
| 10,071,306 | B2 | 9/2018 | Vandonkelaar | |
| 2016/0364910 | A1* | 12/2016 | Higgins | A63F 13/24 |
| 2017/0308165 | A1 | 10/2017 | Erivantcev et al. | |
| 2018/0330521 | A1* | 11/2018 | Samples | G06T 7/248 |
| 2019/0146598 | A1* | 5/2019 | Peri | G06F 3/012 |
| | | | | 345/158 |
| 2019/0318501 | A1* | 10/2019 | Balan | A63F 13/212 |
| 2020/0026348 | A1* | 1/2020 | Nienstedt | G06F 1/1686 |

(Continued)

FOREIGN PATENT DOCUMENTS

| | | |
|---|---|---|
| CN | 108844529 A | 11/2018 |
| CN | 111095167 A | 5/2020 |

(Continued)

OTHER PUBLICATIONS

X F Jia et al, J. Phys.: Conf. Ser. 960 012032 (Year: 2018).*

(Continued)

*Primary Examiner* — Bryan Earles
(74) *Attorney, Agent, or Firm* — Birch, Stewart, Kolasch & Birch, LLP

(57) ABSTRACT

A virtual reality tracker includes a first part and a second part. The first part includes a plurality of first light-emitting diodes (LEDs) and an inner measurement unit (IMU). The inertial measurement unit is used for measuring the acceleration and the triaxial angular velocity of the first part. The second part includes a plurality of second light-emitting diodes. Moreover, the first part and the second part are connected by a flexible component.

18 Claims, 3 Drawing Sheets

(56) References Cited

U.S. PATENT DOCUMENTS

| | | | |
|---|---|---|---|
| 2020/0033937 A1 | 1/2020 | Erivantcev et al. | |
| 2021/0208180 A1* | 7/2021 | Erivantcev | G06F 1/163 |
| 2021/0208673 A1* | 7/2021 | Forster | G06V 40/107 |
| 2022/0011580 A1* | 1/2022 | Muldoon | G06F 3/017 |

FOREIGN PATENT DOCUMENTS

| | | |
|---|---|---|
| EP | 3 622 373 B1 | 6/2021 |
| EP | 3 673 345 B1 | 2/2022 |

OTHER PUBLICATIONS

European Communication pursuant to Article 94(3) EPC for corresponding European Application No. 22200022.6, dated Aug. 29, 2023.

European Search Report for corresponding European Application No. 22200022.6, dated Aug. 17, 2023.

Parizi et al., "RotoWrist: Continuous Infrared Wrist Angle Tracking using a Wristband," VRST '21, Dec. 8, 2021, 11 pages total.

\* cited by examiner

VIRTUAL REALITY TRACKER AND TRACKER CORRECTION POSITION METHOD

BACKGROUND OF THE INVENTION

Field of the Invention

The present disclosure relates to a virtual reality system and, in particular, to a virtual reality tracker and a method for correcting the position of the tracker suitable for the virtual reality system.

Description of the Related Art

Generally speaking, a user needs to wear a head-mounted display device to experience a scene in a virtual reality and interact with virtual objects in the scene through a controller or tracker. The number of light-emitting diodes (LEDs) on the controller or tracker needs to reach a certain level so that a camera on the head-mounted display device can capture these light-emitting diodes to track the position of the controller or tracker in three-dimensional space.

However, when the number of LEDs on the controller or tracker reaches a certain level, the wearable controller body may be too large, even larger than the surface of a wristwatch. This situation will prevent the wearable tracker from being properly affixed to the user's body. For example, the tracker may be too large to fit properly and fit snugly on the user's wrist. When an oversized controller is affixed to the wrist with a strap, there may be a gap between the tracker and the wrist, which prevents the head-mounted display device from accurately tracking the controller or tracker or its position in three-dimensional space.

Therefore, how to make the head-mounted display device accurately track the position of the wearable controller in three-dimensional space has become one of the problems to be solved in the art.

BRIEF SUMMARY OF THE INVENTION

In accordance with one feature of the present invention, the present disclosure provides a virtual reality tracker. The virtual reality tracker includes a first part and a second part. The first part includes a plurality of first light-emitting diodes and an inertial measurement unit (IMU), configured to measure the acceleration and the triaxial angular velocity of the first part. The second part includes a plurality of second light-emitting diodes. The first part and the second part are connected by a flexible component.

In one embodiment, the inertial measurement unit includes an accelerometer and a gyroscope. The accelerometer is configured to measure acceleration. The gyroscope is configured to measure triaxial angular velocity. Moreover, the inertial measurement unit transmits the acceleration and the triaxial angular velocity to an inertial calculation program through a transmission interface. According to the acceleration and the triaxial angular velocity, the inertia calculation program calculates the detailed pose using an image-pose back-measurement method. The head-mounted display (HMD) generates a real-time image in the detailed pose.

In one embodiment, the inertial measurement unit transmits the acceleration and the triaxial angular velocity to a head-mounted display device through a transmission interface. A first camera on the head-mounted display device captures the first light-emitting diodes on the first part to generate a plurality of first images. Moreover, the head-mounted display device calculates the first pose of the first light-emitting diodes in three-dimensional space using the first images, the acceleration, and the triaxial angular velocity.

In one embodiment, the head-mounted display device transmits the first pose to the inertial calculation program. The inertial measurement unit transmits the acceleration and the triaxial angular velocity to the inertial calculation program through the transmission interface. The inertia calculation program calculates the detailed pose using an image-pose back-measurement integration method according to the first pose, the acceleration, and the triaxial angular velocity. The head-mounted display device generates a real-time image in the detailed pose.

In one embodiment, the first camera or the second camera on the head-mounted display device captures the second light-emitting diodes on the second part to generate a plurality of second images. The head-mounted display device calculates the second pose of the second light-emitting diodes in three-dimensional space using the second images.

In one embodiment, the first coordinate system of the first pose corresponds to the first camera and the second coordinate system of the second pose corresponds to the second camera. The first coordinate system is different from the second coordinate system.

In one embodiment, the first camera and the second camera are located in the same head-mounted display device. The distance conversion between the first camera and the second camera is defined when the head-mounted display device is deployed. The first coordinate system and the second coordinate system are converted to a general coordinate system, and the calculation of pose is mainly based on the general coordinate system.

In one embodiment, the flexible component is a strap, and when the first part and the second part are bound to an object with the strap, the first pose of the first part at the initial time is multiplied by the displacement amount, which is regarded as being equal to the first pose of the first part at the first time. After multiplying the second pose of the second part at the initial time by the displacement amount to obtain the initial result, and then multiplying the initial result by a transform function, the calculation result obtained is regarded as being equal to the first pose of the first part at the first time.

In accordance with one feature of the present invention, the present disclosure provides a tracker correction position method suitable for a virtual reality system. The tracker correction position method includes capturing a plurality of first light-emitting diodes (LEDs) on the first part to obtain a plurality of first images. The method includes measuring the acceleration and the triaxial angular velocity of the first part using an inertial measurement unit (IMU). The method includes capturing a plurality of second light-emitting diodes (LEDs) on the second part to obtain a plurality of second images. The method includes correcting the position of the tracker according to the first images, the acceleration, the triaxial angular velocity, and the second images. The first part and the second part are connected by a flexible component.

In one embodiment, the tracker correction position method further includes using the inertial measurement unit to transmit the acceleration and the triaxial angular velocity to the head-mounted display device through a transmission interface. The method further includes capturing the first light-emitting diodes on the first part polar bodies using a first camera on the head-mounted display device to generate the first images. The method further includes using the head-mounted display device to calculate the first pose of the first light-emitting diodes in three-dimensional space using the first images, the acceleration, and the triaxial angular velocity.

In one embodiment, the tracker correction position method further includes returning the first pose to an inertial calculation program through the head-mounted display device. The calculation program calculates a detailed pose using an image interpolation method according to the first pose, the acceleration and the triaxial angular velocity, and it transmits the detailed pose to the head-mounted display device through a transmission interface. Moreover, the head-mounted display device generates a real-time image in the detailed pose.

In one embodiment, the tracker correction position method further includes using the inertial measurement unit to transmit the acceleration and the triaxial angular velocity to a head-mounted display device through a transmission interface. The method further includes capturing the first light-emitting diodes on the first part polar bodies using the first camera on the head-mounted display device to generate the first images. The method further includes using the head-mounted display device to calculate the first pose of the first light-emitting diodes in three-dimensional space using the first images, the acceleration and the triaxial angular velocity.

In one embodiment, the tracker correction position method further includes capturing the second light-emitting diodes on the second part using the first camera or the second camera on the head-mounted display device to generate the second images. Moreover, the head-mounted display device calculates the second pose of the second light-emitting diodes in three-dimensional space using the second images.

In one embodiment, the first coordinate system of the first pose corresponds to the first camera, the second coordinate system of the second pose corresponds to the second camera, and the first coordinate system is different from the second coordinate system.

In one embodiment, the first camera and the second camera are located in the same head-mounted display device. The distance conversion between the first camera and the second camera is defined when the head-mounted display device is deployed. The first coordinate system and the second coordinate system are converted to a general coordinate system, and the calculation of pose is mainly based on the general coordinate system.

In one embodiment, the flexible component is a strap, and after the first part and the second part are bound to an object with the strap, the method for correcting the position of the tracker further includes multiplying the first pose of the first part at the initial time by the amount of rotational displacement, it is regarded as being equal to the first pose of the first part at the first time. After multiplying the second pose of the second part at the initial time by the amount of rotational displacement, it is regarded as being equal to the second pose of the second part at the first time. The second pose is multiplied by a transform function to obtain the calculation result, and the calculation result is equal to the first pose of the first part at the first time.

In one embodiment, the transform function is used to transfer the second pose of the second part to the first pose of the first part, and the first pose of the first part at the first time is equal to the second pose of the second part multiplying by the transform function at the first time.

In one embodiment, the tracker correction position method further includes: solving the transform function through the head-mounted display device through the first pose, the second pose and a displacement amount at each of multiple time points.

To sum up, the embodiments of the present invention provide a virtual reality tracker and a tracker correction position method suitable for a virtual reality system. By dividing the wearable tracker into multiple parts, the wearable tracker can be properly fixed on the user's body, such as being attached to the user's wrist, so that the processor of the head-mounted display device can accurately obtain the effect of the position of the tracker in three-dimensional space. In addition, the first camera and the second camera of the head-mounted display device are based on the camera calibration settings in advance, so that the coordinates between the cameras can be uniformly integrated. In this way, the processor of the head-mounted display device can know the positional correlation between the poses of each part by calculating the poses of multiple parts. Position correlation can transpose the coordinate systems of multiple parts to the coordinate system of the same part, so as to achieve the effect of tracking the pose of each part and spatial position of each part more accurately.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

The present invention will be described with respect to particular embodiments and with reference to certain drawings, but the invention is not limited thereto and is only limited by the claims. It will be further understood that the terms "comprises," "comprising," "comprises" and/or "including," when used herein, specify the presence of stated features, integers, steps, operations, elements, and/or components, but do not preclude the presence or addition of one or more other features, integers, steps, operations, elements, components, and/or groups thereof.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

Figure 1:
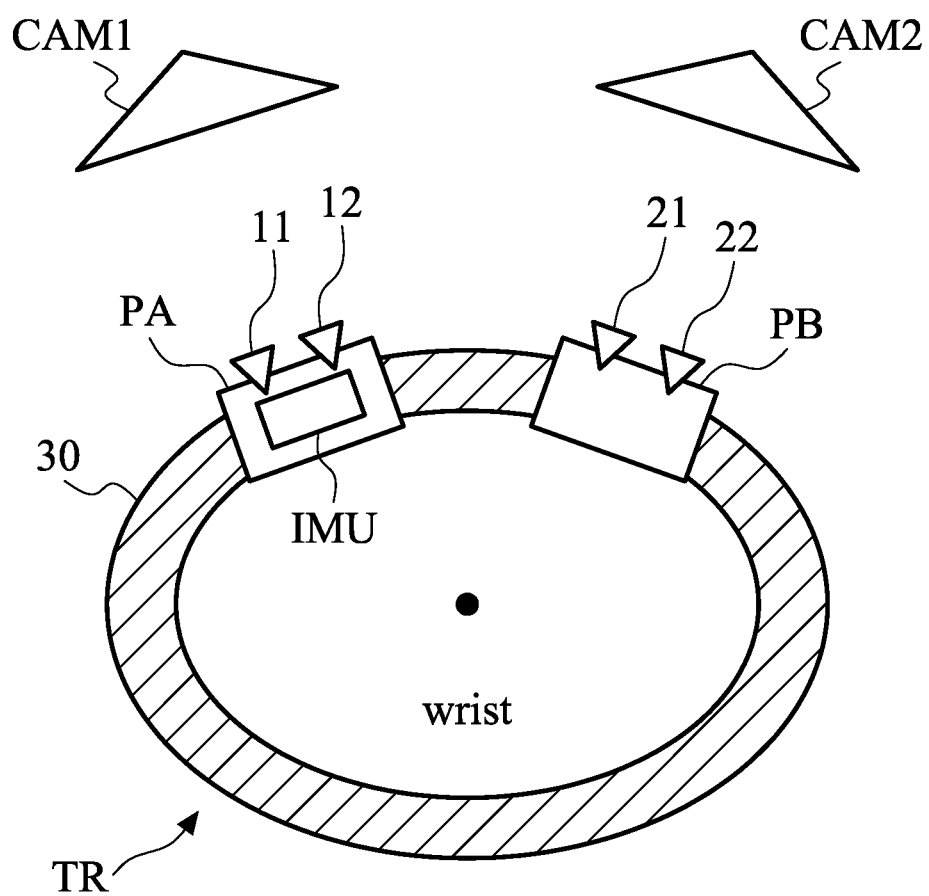
FIG. 1 is a schematic diagram of a virtual reality system 100 in accordance with one embodiment of the present disclosure.

Please refer to FIG. 1. FIG. 1 is a schematic diagram of a virtual reality system 100 in accordance with one embodiment of the present disclosure. In one embodiment, the virtual reality system 100 includes a virtual reality tracker TR. In one embodiment, the plurality of cameras CAM1 and CAM2 are included in a head-mounted display (HMD) (not shown). The head-mounted display device further includes a storage device (not shown) and a processor (not shown).

In one embodiment, the storage device in the head mounted display device may be implemented as ROM, flash memory, floppy disk, hard disk, optical disk, pen drive, magnetic tape, network accessible A database or a person skilled in the art can easily think of a storage medium with the same function.

In one embodiment, the head-mounted display device includes a processor and a plurality of cameras (e.g., cameras CAM1, CAM2).

In one embodiment, the processor in the head mounted display device can be implemented by a microcontroller, a microprocessor, a digital signal processor, an application specific integrated circuit (ASIC) or a logic circuit.

In one embodiment, the plurality of cameras in the head-mounted display device include a first camera CAM1 and a second camera CAM2.

In one embodiment, a plurality of cameras in the head-mounted display device (e.g., cameras CAM1 and CAM2) are arranged at different positions of the head-mounted display device. Moreover, cameras CAM1 and CAM2 can capture environmental images.

For the convenience of description, the cameras CAM1 and CAM2 in FIG. 1 are used as examples for the plurality of cameras in the head-mounted display device below.

In one embodiment, each of the first camera CAM1 and the second camera CAM2 can be implemented by a charge coupled device (CCD) or a complementary metal-oxide semiconductor (CMOS).

In one embodiment, the virtual reality tracker TR includes part PA and part PB.

In one embodiment, the virtual reality tracker TR may contain more parts. For the convenience of description, the multiple parts of the virtual reality tracker TR are exemplified by part PA and part PB in FIG. 1 below. However, the number of parts of the present invention is not limited thereto.

In one embodiment, part PA and part PB can each be implemented by a carrier. The material of the carrier is, for example, plastic, carbon fiber. Moreover, the shell of the carrier can be made of metal.

In one embodiment, the part PA includes a plurality of first light-emitting diodes (light-emitting diodes, LEDs) 11, 12. In one embodiment, the part PA may include more first light-emitting diodes. For the convenience of description, the first light-emitting diode of part PA. The following takes the first light-emitting diode 11 and the first light-emitting diode 12 in FIG. 1 as an example.

In one embodiment, part PA includes an inertial measurement unit (IMU). The inertial measurement unit IMU is used to measure an acceleration and a triaxial angular velocity of the part PA.

In one embodiment, part PB includes a plurality of second light-emitting diodes (LEDs) 21, 22. In one embodiment, part PB may include more second light-emitting diodes. For the convenience of description, the second light-emitting diode of part PB is exemplified below by the second light-emitting diode 21 and the second light-emitting diode 22 in the FIG. 1.

In one embodiment, when the camera CAM1 captures the part PA, the plurality of first light-emitting diodes 11 and 12 on the part PA are in a light-emitting state. When the camera CAM2 captures part PB, the plurality of second light-emitting diodes 21 and 22 on the part PB are in a light-emitting state.

In this way, the camera CAM1 can transmit the multiple first images captured by the part PA to the processor of the head-mounted display device for subsequent processing. The processor calculates the relative position of part PA to the camera CAM1, or the position of the part PA to the three-dimensional coordinate system of the camera CAM1 according to the positions of the first light-emitting diodes 11 and 12 with brightness in the plurality of first images. Similarly, the camera CAM2 can transmit multiple second images captured by part PB to the processor of the head-mounted display device for subsequent processing. The processor calculates the relative position of part PB to the camera CAM2, or the position of part PB to the three-dimensional coordinate system of the camera CAM2 according to the positions of the second light-emitting diodes 21 and 22 with brightness in the plurality of second images.

Since it is a known technology to calculate the three-dimensional coordinate position of an object in space according to a plurality of images, for example, a three-dimensional object tracking algorithm, a three-dimensional modeling algorithm, a multi-view image synthesis algorithm, etc., it will not be further described here.

In one embodiment, part PA and part PB are connected by a flexible component 30. The flexible component 30 (marked with slashes) is, for example, straps, elastic cords, fixing belts, belts, etc., as long as the degree of tightness can be adjusted, accessories that make part PA and part PB fit to the object can be used to realize flexible component 30.

In an embodiment, the tracker TR fixes the part PA and the part PB on an object through the flexible component 30 (such as a strap). The objects are the human body parts, for example, wrist, arm, ankle, thigh, waist, etc. In the first picture, the wrist is taken as an example.

In one embodiment, the tracker TR fixes the part PA and the part PB on an object through the flexible component 30 (e.g., a strap). Examples of objects are: rackets, bats, toy pistols, steering wheels, and other physical props.

In one embodiment, the inertial measurement unit IMU includes an accelerometer and a gyroscope. The accelerometer is used to measure acceleration. The gyroscope is used to measure triaxial angular velocity.

In one embodiment, the acceleration and the triaxial angular velocity measured by the inertial measurement unit IMU are transmitted to the inertial calculation program and a detailed pose is calculated by an image back-measurement integration method. The processor of the head-mounted display device generates a real-time image in the detailed pose.

In one embodiment, the inertial measurement unit IMU transmits the acceleration and the triaxial angular velocity to an inertial calculation program through a transmission interface. The inertia calculation program calculates the detailed pose with an image pose back-test method based on the acceleration and the triaxial angular velocity.

In one embodiment, acceleration is measured with the accelerometer of the inertial measurement unit IMU. Moreover, the triaxial angular velocity is measured with the gyroscope of the inertial measurement unit IMU. The inertia calculation program calculates a detailed pose using an image interpolation method according to the acceleration and the triaxial angular velocity, and transmits the detailed pose to a head-mounted display (HMD) through a transmission interface. The head-mounted display device generates a real-time image in the detailed pose.

In one embodiment, when the camera CAM1 and/or the camera CAM2 just do not capture the first light-emitting diodes 11, 12 that are emitting light or the second light-emitting diodes 21, 22 that are not light-emitting, the integration method of the inertial calculation program calculates the subsequent detailed poses until the illuminant is observed. The plurality of first images and/or the plurality of second images can be continuous.

In one embodiment, the inertial measurement unit IMU transmits the acceleration and the triaxial angular velocity to the inertial calculation program through a transmission interface. The camera CAM1 on the head-mounted display device captures the first light-emitting diodes 11 and 12 on the part PA to generate a plurality of first images. The head-mounted display device calculates the first pose of the first light-emitting diodes 11 and 12 in three-dimensional space through the first images, the acceleration, and the triaxial angular velocity.

In one embodiment, the pose of the present invention includes a rotation matrix R and a translation vector T. The content of the rotation matrix R is synonymous with the three-dimensional rotation matrix: the rotation angle is given by the three direction axes. The translation vector T is exactly the coordinates of the origin of the world coordinate system in the camera coordinate system. In particular, the "depth" of the origin of the world coordinate system in the camera coordinate system is generally represented by the symbol Tz.

In one embodiment, the processor of the head-mounted display device can apply a known algorithm, such as a three-dimensional Pose from Orthography and Scaling with Iterations (POSIT) algorithm, to calculate the first pose of the first light-emitting diodes 11 and 12 in three-dimensional space. However, the present invention is not limited thereto, as long as it can be applied in the virtual reality space, any algorithm for calculating the pose of the object can be used.

In one embodiment, the detailed pose may be the acceleration and the triaxial angular velocity of the part PA in a short period of time (about 1-2 microseconds).

In one embodiment, the head-mounted display device transmits the first pose to the inertia calculation program. The inertial measurement unit IMU transmits the acceleration and the triaxial angular velocity to the inertial calculation program through the transmission interface. According to the first pose, the acceleration and the triaxial angular velocity, the inertia calculation program calculates the detailed pose using an image-pose back-measurement integration method. The head-mounted display device generates a real-time image in the detailed pose.

Therefore, assuming that the frame rate per second of the camera CAM1 is 30, this is not enough and too late to provide the display content of the head-mounted display device. The real-time image generated in the detailed pose can help to provide the display content of the head-mounted display device in real-time.

In one embodiment, the camera CAM1 or the camera CAM2 on the head-mounted display device captures the second light-emitting diodes 21 and 22 on the part PB to generate a plurality of second images. The head-mounted display device calculates the second pose of the second light-emitting diodes 21 and 22 in three-dimensional space using the second images.

In one embodiment, in the virtual reality, part PA and part PB can be regarded as being in the same three-dimensional space. However, the first coordinate system of the first pose corresponds to the camera CAM1. The second coordinate system of the second pose corresponds to the camera CAM2. The first coordinate system is different from the second coordinate system. The relative transposition of camera CAM1 and camera CAM2 when constructed through the head-mounted display device has been established. Therefore, the relative positional relationship between part PA and part PB can be known.

In one embodiment, the camera CAM1 and the camera CAM2 are located in the same head-mounted display device. The distance conversion between the camera CAM1 and the camera CAM2 is defined when the head-mounted display device is constructed. Therefore, the conversion between the first coordinate system and the second coordinate system is a known general coordinate system. The pose calculation is mainly based on the general coordinate system.

Figure 2:
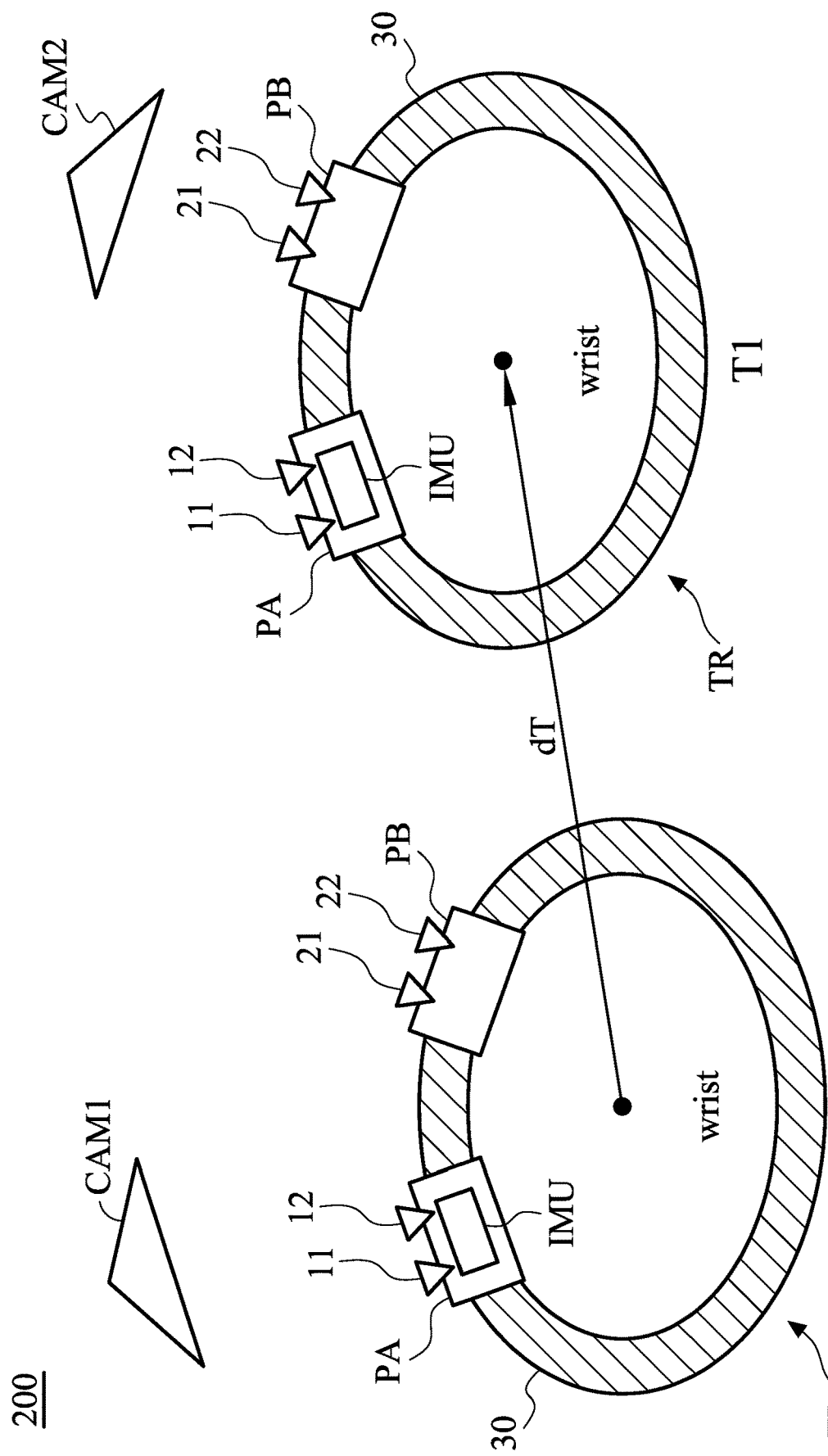
FIG. 2 is a schematic diagram of a tracker correction position method 200 in accordance with one embodiment of the present disclosure.

Please refer to FIG. 2, which is a schematic diagram of a tracker correction position method 200 in accordance with one embodiment of the present disclosure. When the wrist wearing the tracker TR moves from the position of time T0 to the position of time T1, the cameras CAM1 and CAM2 of the head-mounted display device capture the images of part PA and part PB of times T0 and T1. The head-mounted display device successively calculates the first pose of part PA and the second pose of part PB at times T0 and T1, and the positional correlation between part PA and part PB.

In one embodiment, please refer to FIG. 2, the flexible component 30 is a strap. When part PA and part PB are tied to an object (e.g., a wrist) with the strap 30, the first pose of part PA at the initial time T0 is multiplied by a displacement amount to obtain a first initial result, is the first initial result is regarded as being equal to the first pose of part PA at the first time T1. Moreover after multiplying the second pose of part PB at the initial time T0 by the displacement amount to obtain the second initial result, and then multiplying the second initial result by a transform function to obtain the calculation result, and the calculation result is regarded as being equal to the first pose of the part PA at the first time T1.

In one embodiment, the flexible component 30 is a strap. After part PA and part PB are tied to an object with the strap, the tracker correction position method further includes: multiplying the first pose of part PA at the initial time T0 by the amount of rotational displacement to obtain a first initial result, the first initial result is regarded as being equal to the first pose of part PB at the first time T1. After multiplying the second pose of part PB at the initial time T0 by the amount of rotational displacement to obtain a second initial result, the second initial result is regarded as being equal to the second pose of part PB at the first time T1. The second pose is multiplied by a transform function to obtain the calculation result, and the calculation result is regarded as being equal to the first pose of the part PA at the first time T1. In one embodiment, the transform function is used to transfer the second pose of the part PB to the first pose of the part PA, and the first pose of the part PA at the first time T1 is equal to the second pose of the part PB multiplied by the transform function at the first time T1.

In an embodiment, please refer to FIG. 2, the flexible component 30 is a strap. After part PA and part PB are tied to an object (e.g., a wrist) with the strap 30, the processor of the head-mounted display device performs the following operations. Between the first pose of part PA at the initial time T0 and the first time T1, the inertial calculation program continues to calculate the detailed pose. The first pose calculated by part PA at the first time T1 has the detailed pose content with reference of the inertia calculation program. Therefore, the first pose has high accuracy. Since tracker TR, part PA and part PB are regarded as a whole, the pose change dT (a rotation matrix and a displacement vector) of part PA from the initial time T0 to the first time T1 can be regarded as the pose change of the tracker TR itself.

More specifically, the cameras CAM1 and CAM2 capture part PA and PB at times T0 and T1, respectively, for example, capturing a picture by a frame rate of 30. The processor of the head-mounted display device calculates the first pose of part PA and the second pose of part PB at times T0 and T1, respectively. Assuming that the displacement amount dT of part PA from time T0 to time T1 is known to be similar to the transform function, the formula can be obtain: dT*Pose(PA:T0)~=Pose(PA:T1). The symbol Pose(PA:T0) represents the first pose of part PA at time T0, and the symbol Pose(PA:T1) represents the first pose of part PA at time T1.

Because the first coordinate system of the first pose corresponds to the camera CAM1, the second coordinate system of the second pose corresponds to the camera CAM2, and part PA and part PB can be regarded as a steel body only after the straps 30 are fixed, the relative positional relationship between part PB and part PA can be measured. This transform function is represented by the symbol TBA below.

Generally speaking, when part PA and part PB are located in the same image and captured by camera CAM1, since part PA and part PB are connected together, the transform function TBA can be easily calculated by the formula: [pose B]$^{-1}$[pose A]. The symbol "pose B" is the second pose of part PB, and the symbol "pose A" is the first pose of part PA. However, there is no inertial measurement unit IMU on part PB, and the second pose can only be calculated by the second light-emitting diodes 21 and 22 in the image. The error of the second pose is relatively large, resulting in the transform function TBA calculated by the formula may not be precise enough. In other words, since part PA and part PB are connected together, and the inertial measurement unit IMU is included on part PA, the first pose can be calculated with high accuracy. There is no inertial measurement unit IMU on part PB, so the second pose has a certain error. However, it is known that part PA and part PB can be regarded as a steel body after being fixed by the strap 30. Therefore, the pose change dT calculated by part PA can be regarded as the pose change of part PB. If the error of the second pose calculated by part PB at the initial time T0 and the first time T1 is small enough, the pose change of the second pose will be close to dT. Therefore, dT*TBA*Pose(PB:T0)~=TBA*Pose(PB:T1) is satisfied. The symbol Pose(PB:T0) represents the second pose of part PB at time T0, and the symbol Pose(PB:T1) represents the second pose of part PB at time T1.

The head-mounted display device calculates multiple displacement amounts dT1-dTn corresponding to multiple times T1-Tn to obtain:

$dT1*Pose(PA:T0)$~=$Pose(PA:T1)$ $dT2*Pose(PA:T1)$~=$Pose(PA:T2)$

. . .

$dTn*Pose(PA:Tn-1)$~=$Pose(PA:Tn)$

The symbol dT2 is the displacement amount of the tracker TR from time T1 to T2. The symbol dTn is the displacement amount of the tracker TR in the time Tn−1~Tn. The symbol Pose(PA:T2) represents the first pose of part PA at time T2. The symbol Pose(PA:Tn−1) represents the first pose of part PA at time Tn−1. The symbol Pose(PA:Tn) represents the first pose of part PA at time Tn.

Since TBA is the transform function of part PA and part PB, with the calculation of the above multiple sets of formulas, it can be deduced that dTn*TBA*Pose(PB:Tn)~=TBA*Pose(PB:Tn+1). The symbol Pose(PB:Tn) represents the second pose representing part PB at time Tn, and the symbol Pose(PB:Tn+1) represents the second pose representing part PB at time Tn+1.

For the moving positions of part PA and part PB in each two frames, a set of transform functions TBA can be obtained, and the transform function TBA can be more precisely defined by integrating multiple sets of transform functions. According to the user's actions and the images captured at each time point, the following correction functions can be obtained:

$$T(BnAn) = Pose(Btn)^{-1} * Pose(Atn)$$

when the calibration function starts to be calculated by the processor of the head-mounted display device, the user is required to move the wrist for a period of time to obtain multiple samples for the transform function TBA. The processor then calculates the final transform function TBA using a weighted average of the samples of the transform function TBA.

For each transform function TBA, the weight Wn can be set in the following way:

$$w_n = \frac{\|T(A_n A_{n+1})\|^2 - \|T(A_n A_{n+1}) - T(B_n B_{n+1})\|^2}{\|T(A_n A_{n+1})\|^2}$$

where:

$$T((A_n A_{n+1}) = Pose(A_{tn})^{-1} * Pose(A_{tn+1})$$

$$T((B_n B_{n+1}) = Pose(B_{tn})^{-1} * Pose(B_{tn+1})$$

The symbol T(AnAn+1) represents the pose change of part PA from the Nth time to the N+1th time. The symbol T(BnBn+1) represents the pose change of part PB from the Nth time to the N+1th time. The symbol Pose(Atn) represents the first pose of part PA at the Nth time. The symbol Pose(Atn+1) represents the first pose of part PA at the N+1th time. The symbol Pose(Btn) represents the second pose of part PB at the Nth time. The symbol Pose(Btn+1) represents the second pose of part PB at the Nth time. Through the weights Wn of the samples of the transform functions TBA, the weights Wn can be averaged to obtain the final transform function TBA.

In one embodiment, in order to ensure that the weight Wn of the samples of each transform function TBAn is good enough (wherein, the symbol n represents the number of the transform function TBA), the processor only collects data between 0.95-1 to calculate the average.

The final transform function TBA is calculated by multiplying each group of TBA by the corresponding weight and then dividing by the sum total of the weights. It is defined as follows:

$$T(BA) = \text{sum}(\text{normal}(w_n) * T(B_n A_n)),$$

where $$\text{normal}(w_n) = \frac{w_n}{\text{sum}(w))}$$

The symbol T(BA) represents the calculation formula of the final transform function TBA, and the symbol sum(w) represents the sum of all weights. The symbol normal(Wn) represents the weight of the nth group divided by the sum of the weights, the symbol T(BnAn) represents the TBA of the nth group. Moreover, the sum is the sum function, that is, from n is 1 base addition to all. In this way, the symbol T(BA) is regarded as the final transform function TBA, and the following content is calculated using this transform function TBA.

In one embodiment, the head-mounted display device solves the transform function TBA through the first pose, the second pose and the displacement amount dT at each of the time points.

In one embodiment, the head-mounted display device is in the calibration process, that is, after the TBA calculation is completed, the part PB can calculate the coordinate system position of each LED to the part PA for each second light-emitting diode (i.e., part PB) through TBA.

Figure 3:
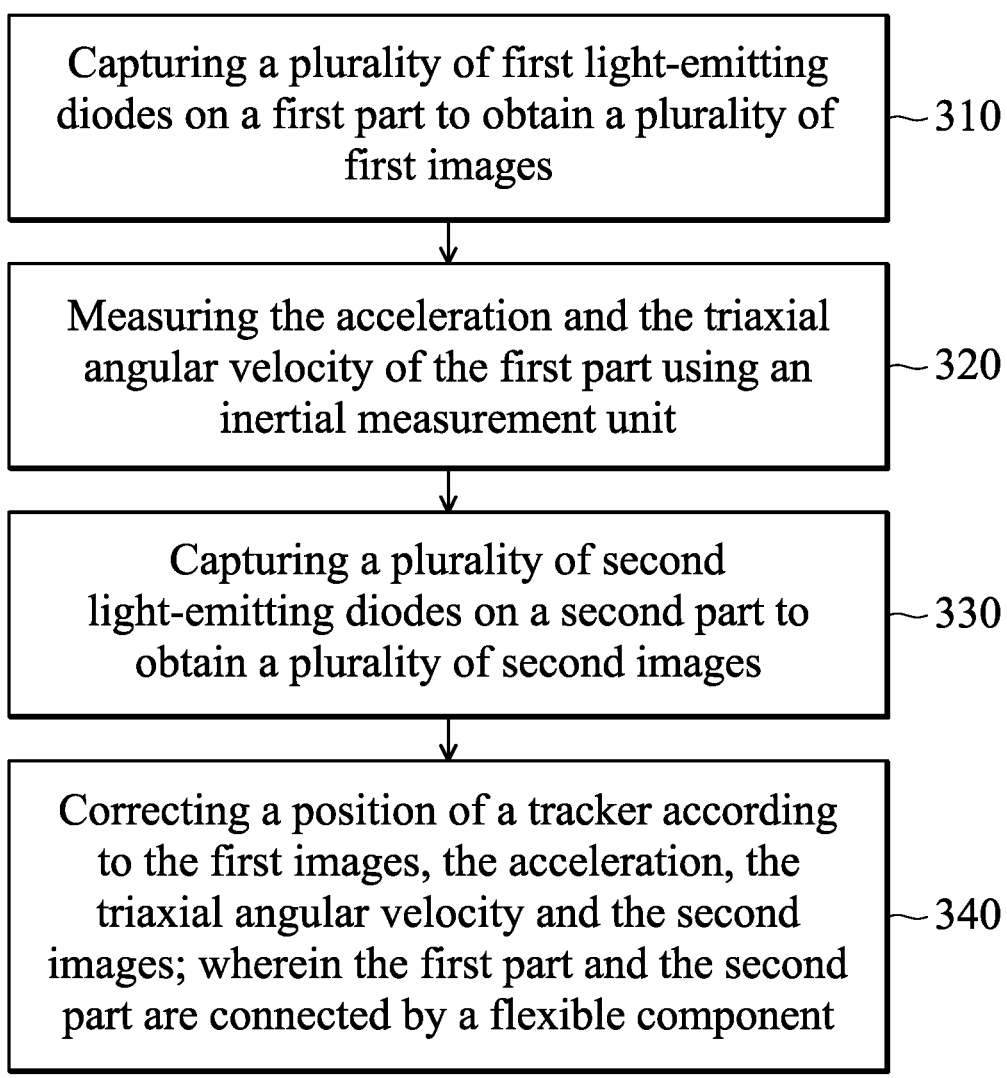
FIG. 3 is a flowchart of a tracker correction position method 300 in accordance with one embodiment of the present disclosure.

Please refer to FIG. 3. FIG. 3 is a flowchart of a tracker correction position method 300 in accordance with one embodiment of the present disclosure. The tracker correction position method 300 is suitable for use in a virtual reality system.

In step 310, a plurality of first light-emitting diodes (such as the first light-emitting diodes 11 and 12) on a first part (such as part PA) are captured by a first camera (such as the camera CAM1) to obtain a plurality of first images.

In step 320, an acceleration and a triaxial angular velocity of the first part are measured by an inertial measurement unit (e.g., an inertial measurement unit IMU).

In step 330, a plurality of second light-emitting diodes (such as the second light-emitting diodes 21, 22) of a second part (such as part PB) are captured by the second camera (such as the camera CAM2), to obtain a plurality of second images.

In step 340, the processor of the head mounted display device corrects the position of each LED (for example, a first light-emitting diode and a second light-emitting diode) on the tracker according to the first images, the acceleration, the triaxial angular velocity, and the second images, and the first part and the second part are connected by a flexible component (e.g., flexible component 30).

In one embodiment, the first camera and the second camera can be the same camera, as long as the capturing angle of the camera is wide enough to cover the range of capturing multiple parts on the tracker TR. In other words, there is no limit to the number of cameras, and the number of cameras depends on the range that the cameras can capture multiple parts on the tracker TR.

To sum up, the embodiments of the present invention provide a virtual reality tracker and a tracker correction position method suitable for a virtual reality system. By dividing the wearable tracker into multiple parts, the wearable tracker can be properly fixed on the user's body, such as being attached to the user's wrist, so that the processor of the head-mounted display device can accurately obtain the effect of the position of the tracker in three-dimensional space. In addition, the first camera and the second camera of the head-mounted display device are based on the camera calibration settings in advance, so that the coordinates between the cameras can be uniformly integrated. In this way, the processor of the head-mounted display device can know the positional correlation between the poses of each part by calculating the poses of multiple parts. Position correlation can transpose the coordinate systems of multiple parts to the coordinate system of the same part, so as to achieve the effect of tracking the pose of each part and spatial position of each part more accurately.

Although the invention has been illustrated and described with respect to one or more implementations, equivalent alterations and modifications will occur or be known to others skilled in the art upon the reading and understanding of this specification and the annexed drawings. In addition, while a particular feature of the invention may have been disclosed with respect to only one of several implementations, such a feature may be combined with one or more other features of the other implementations as may be desired and advantageous for any given or particular application.

What is claimed is:

1. A virtual reality tracker, comprising:
   a first part, comprising:
      a plurality of first light-emitting diodes; and
      an inertial measurement unit (IMU), configured to measure an acceleration and a triaxial angular velocity of the first part; and
   a second part, comprising:
      a plurality of second light-emitting diodes;
   wherein the first part and the second part are connected by a flexible component,
   wherein the inertial measurement unit transmits the acceleration and the triaxial angular velocity to a head-mounted display (HMD) device,
   wherein the head-mounted display device captures the first light-emitting diodes on the first part to generate a plurality of first images,
   wherein the head-mounted display device calculates a first pose of the first light-emitting diodes in three-dimensional space through the first images, the acceleration, and the triaxial angular velocity, and
   wherein when the first part and the second part are bound to an object, the first pose of the first part at an initial time is multiplied by a displacement amount, which is regarded as being equal to the first pose of the first part at a first time; and after multiplying a second pose of the second part at the initial time by the displacement amount to obtain an initial result, and then multiplying the initial result by a transform function, a calculation result obtained is regarded as being equal to the first pose of the first part at the first time.

2. The virtual reality tracker of claim 1, wherein the inertial measurement unit comprises:
   an accelerometer, configured to measure acceleration; and
   a gyroscope, configured to measure triaxial angular velocity;
   wherein the inertial measurement unit transmits the acceleration and the triaxial angular velocity to an inertial calculation program through a transmission interface; according to the acceleration and the triaxial angular velocity, the inertia calculation program calculates a detailed pose using an image-pose back-measurement method; and the head-mounted display device generates a real-time image in the detailed pose.

3. The virtual reality tracker of claim 1, wherein the inertial measurement unit transmits the acceleration and the triaxial angular velocity to the head-mounted display device through a transmission interface; and
   a first camera on the head-mounted display device captures the first light-emitting diodes on the first part to generate the plurality of first images.

4. The virtual reality tracker of claim 3, wherein the head-mounted display device transmits the first pose to the inertial calculation program, the inertial measurement unit transmits the acceleration and the triaxial angular velocity to the inertial calculation program through the transmission interface; the inertia calculation program calculates a detailed pose using an image-pose back-measurement integration method according to the first pose, the acceleration and the triaxial angular velocity; and
   the head-mounted display device generates a real-time image in the detailed pose.

5. The virtual reality tracker of claim 3, wherein the first camera or a second camera on the head-mounted display device captures the second light-emitting diodes on the second part to generate a plurality of second images; and
   the head-mounted display device calculates the second pose of the second light-emitting diodes in three-dimensional space using the second images.

6. The virtual reality tracker of claim 5, wherein a first coordinate system of the first pose corresponds to the first camera;
   wherein a second coordinate system of the second pose corresponds to the second camera;
   the first coordinate system is different from the second coordinate system.

7. The virtual reality tracker of claim 5, wherein the first camera and the second camera are located in the same head-mounted display device; a distance conversion between the first camera and the second camera is defined when the head-mounted display device is deployed; the first coordinate system and the second coordinate system are converted to a general coordinate system, and the calculation of pose is mainly based on the general coordinate system.

8. The virtual reality tracker of claim 3, wherein the flexible component is a strap.

9. A tracker correction position method, suitable for use in a virtual reality system, wherein the tracker correction position method comprises:
   capturing a plurality of first light-emitting diodes (LEDs) on a first part to obtain a plurality of first images;
   measuring the acceleration and the triaxial angular velocity of the first part using an inertial measurement unit (IMU);
   capturing a plurality of second light-emitting diodes (LEDs) on a second part to obtain a plurality of second images; and
   correcting a position of a tracker according to the first images, the acceleration, the triaxial angular velocity and the second images;
   wherein the first part and the second part are connected by a flexible component,
   wherein the tracker correction position method further comprising:
   the inertial measurement unit transmitting the acceleration and the triaxial angular velocity to a head-mounted display (HMD) device;
   the head-mounted display device capturing the first light-emitting diodes on the first part polar bodies to generate the first images; and
   the head-mounted display device calculates a first pose of the first light-emitting diodes in three-dimensional space using the first images, the acceleration and the triaxial angular velocity,
   wherein after the first part and the second part are bound to an object, the tracker correction position method further comprises:
   multiplying the first pose of the first part at the initial time by an amount of rotational displacement is regarded as being equal to the first pose of the first part at the first time; and
   after multiplying a second pose of the second part at the initial time by the amount of rotational displacement, it is regarded as being equal to the second pose of the second part at the first time; wherein the second pose is multiplied by a transform function to obtain the calculation result, and the calculation result is equal to the first pose of the first part at the first time.

10. The tracker correction position method of claim 9, further comprising:
    measuring acceleration with an accelerometer of the inertial measurement unit; and
    measuring triaxial angular velocity with a gyroscope of the inertial measurement unit;
    wherein the inertial measurement unit calculates a detailed pose using an image interpolation method according to the first images, the acceleration, and the triaxial angular velocity, and transmits the detailed pose to the head-mounted display device through a transmission interface, wherein the head-mounted display device generates a real-time image in the detailed pose.

11. The tracker correction position method of claim 9, wherein the step of the inertial measurement unit transmitting the acceleration and the triaxial angular velocity to a head-mounted display device comprises:
    the inertial measurement unit transmits the acceleration and the triaxial angular velocity to the head-mounted display device through a transmission interface; and
    wherein the step of the head-mounted display device capturing the first light-emitting diodes on the first part polar bodies to generate the first images comprises:
    a first camera on the head-mounted display device captures the first light-emitting diodes on the first part polar bodies to generate the first images.

12. The tracker correction position method of claim 11, further comprising:
    returning the first pose to an inertial calculation program through the head-mounted display device;
    wherein the calculation program calculates a detailed pose using the image interpolation method according to the first pose, the acceleration and the triaxial angular velocity, and transmits the detailed pose to the head-mounted display device through a transmission interface;
    wherein the head-mounted display device generates a real-time image in the detailed pose.

13. The tracker correction position method of claim 11, further comprising:
    capturing the second light-emitting diodes on the second part using the first camera or the second camera on the head-mounted display device to generate the second images;

wherein the head-mounted display device calculates the second pose of the second light-emitting diodes in three-dimensional space using the second images.

14. The tracker correction position method of claim 13, wherein the first coordinate system of the first pose corresponds to the first camera; wherein the second coordinate system of the second pose corresponds to the second camera; and the first coordinate system is different from the second coordinate system.

15. The tracker correction position method of claim 13, wherein the first camera and the second camera are located in the same head-mounted display device; the distance conversion between the first camera and the second camera is defined when the head-mounted display device is deployed; the first coordinate system and the second coordinate system are converted to a general coordinate system, and the calculation of pose is mainly based on the general coordinate system.

16. The tracker correction position method of claim 13, wherein the flexible component is a strap.

17. The tracker correction position method of claim 16, wherein the transform function is used to transfer the second pose of the second part to the first pose of the first part, and the first pose of the first part at the first time is equal to the second pose of the second part multiplying by the transform function at the first time.

18. The tracker correction position method of claim 17, further comprising:
- solving the transform function through the head-mounted display device through the first pose, the second pose and a displacement amount at each of multiple time points.

\* \* \* \* \*